E. G. RUST.
CONTAINER CLOSURE.
APPLICATION FILED JULY 24, 1919.
1,377,526.
Patented May 10, 1921.
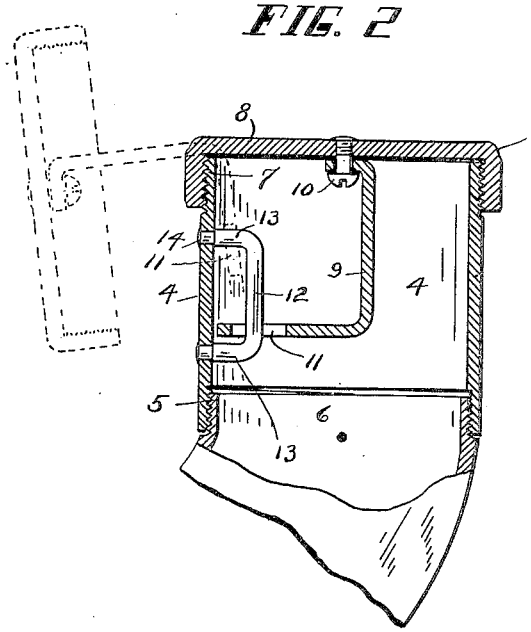
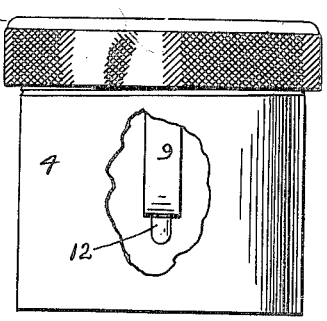
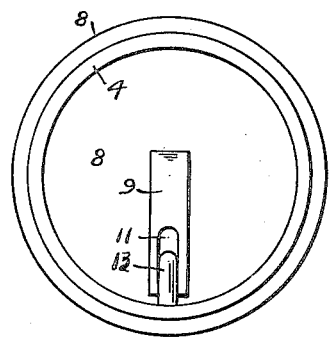
INVENTOR
E. G. RUST
BY
Milton D. Crandall
ATTORNEY

UNITED STATES PATENT OFFICE.

EDWIN G. RUST, OF SIOUX CITY, IOWA.

CONTAINER-CLOSURE.

1,377,526.   Specification of Letters Patent.   Patented May 10, 1921.

Application filed July 24, 1919.  Serial No. 313,005.

*To all whom it may concern:*

Be it known that I, EDWIN G. RUST, a citizen of the United States, and a resident of Sioux City, in the county of Woodbury and State of Iowa, have invented certain new and useful Improvements in Container-Closures, of which the following is a specification.

The invention has for its primary object the production of an improved cap particularly adapted for the fuel tanks and radiators of motor vehicles and so constructed as to be instantly applied or removed and embodying means whereby the cap cannot be lost from the container.

Another object of the invention is the production of a cap for motor vehicle fuel tanks and radiators embodying simple yet efficient means completely inclosed by the device to prevent loss of the cap from the container.

With these and other objects in view, the invention consisting in the construction, combination and novel arrangement of parts, will be fully understood from the following description, reference being had to the accompanying drawing, which forms a part of this application and in which like characters of reference indicate corresponding parts throughout the several views, of which,—

Figure 1 is a front elevation of a cap constructed in accordance with the invention, a portion thereof being cut away;

Fig. 2 is a central vertical section thereof taken at right angles to Fig. 1; and Fig. 3 is an inverted plan of the device.

Although I have illustrated and hereinafter described the preferred embodiment of the invention, I would not be understood as being limited to the specific structure chosen for illustration, for various alterations and modifications may be made in the details of construction and arrangement of parts described, without departing from the spirit and scope of the invention as defined in the appended claims:

Referring, now, to the illustrations, the device consists, essentially, of a short cylindrical tube, 4, internally threaded at its lower end as at 5, to be screwed on to the usual externally threaded neck, 6, of a motor vehicle fuel tank or radiator. The upper end of the tube is externally threaded as at 7, on to which is screwed the usual fuel tank cap or radiator cap, 8.

Within the tube is a link, preferably a metal strip, 9, bent at right-angles and having one end swivelly secured to the underside of the cap as by fixing in the center of the underside of the cap, a screw or stud, 10, on which is pivoted the upper end of the strip, 9. The lower end portion of the strip, 9, is provided with a longitudinal slot, 11, to freely inclose a vertical guide bar, 12, carried by and in spaced relation to the inner periphery of the tube as by bending the end portions, 13, of the bar, laterally and riveting or otherwise suitably securing them as at 14, to the wall of the tube.

By virtue of this construction it is clear the device may be instantly applied to or removed from the tube and when unscrewed from the tube the cap assumes, somewhat, the position indicated in dotted lines in Fig. 2, thus offering no obstruction to the introduction of liquid into the tube yet preventing loss or accidental misplacement of the cap.

Obviously, the tube, 4, should be screwed sufficiently tight upon the neck, 6, to prevent accidental misplacement therefrom.

Having thus described my invention, what I claim as new and desire to secure by Letters Patent of the United States, is,—

1. A container closure including a tube having a threaded end portion, a cap screwed thereto, an upright bar within the tube having laterally extending end portions secured to the inner periphery of the tube, whereby the bar is supported rigidly in spaced relation to the tube, and a keeper consisting of an L-shaped flat strip having one end pivotally secured to the cap and the other end slotted to slide upon the bar.

2. A container closure including a tube having a threaded end portion, a cap screwed thereto, an upright bar within the tube having laterally-extending end portions secured to the inner periphery of the tube, whereby the bar is spaced from the tube, and a keeper, consisting of an L-shaped link having one end pivoted to the cap and the other end slotted to encompass and slide upon the bar, said bar, its upper end portion, and said link being so mounted, constructed and related that the cap may be unscrewed and swung laterally to such position that one arm of the link rests adjacent the inner periphery of the tube, and the other arm thereof rests on the upper edge of the tube.

In testimony whereof I have hereunto set my hand this 21st day of July, 1919.

EDWIN G. RUST.